(12) United States Patent
Chamberlin et al.

(10) Patent No.: US 9,809,181 B2
(45) Date of Patent: Nov. 7, 2017

(54) SYSTEMS AND METHODS FOR COVERING ACCESS PORTS

(71) Applicant: Remy Technologies, LLC, Pendleton, IN (US)

(72) Inventors: Bradley D. Chamberlin, Pendleton, IN (US); Steve Burton, Anderson, IN (US)

(73) Assignee: BorgWarner Inc., Auburn Hills, MI (US)

( * ) Notice: Subject to any disclaimer, the term of this patent is extended or adjusted under 35 U.S.C. 154(b) by 91 days.

(21) Appl. No.: 14/528,199

(22) Filed: Oct. 30, 2014

(65) Prior Publication Data
US 2015/0055317 A1 Feb. 26, 2015

Related U.S. Application Data

(63) Continuation of application No. PCT/US2013/038946, filed on Apr. 30, 2013.

(60) Provisional application No. 61/640,333, filed on Apr. 30, 2012.

(51) Int. Cl.
*B60K 17/00* (2006.01)
*B60R 16/023* (2006.01)

(52) U.S. Cl.
CPC ................ *B60R 16/0239* (2013.01)

(58) Field of Classification Search
CPC .................................................. B60K 6/405
USPC ..... 180/69.24, 68.5, 378; 296/37.8; 903/952
See application file for complete search history.

(56) References Cited

U.S. PATENT DOCUMENTS

| 3,583,513 | A | * | 6/1971 | Macadam | B62D 25/105 180/69.24 |
| 4,761,852 | A | | 8/1988 | Sauber | |
| 4,986,096 | A | | 1/1991 | Soehner et al. | |
| 5,415,603 | A | * | 5/1995 | Tuzuki | B60K 6/26 477/138 |
| 5,524,508 | A | * | 6/1996 | Peters | F02B 61/06 74/606 R |
| 5,542,489 | A | * | 8/1996 | Allison | B60R 16/04 180/68.5 |
| 6,022,287 | A | * | 2/2000 | Klemen | B60K 6/26 180/65.225 |
| 6,663,170 | B1 | * | 12/2003 | Miga | B60N 3/04 180/69.2 |

(Continued)

FOREIGN PATENT DOCUMENTS

CN 101725409 A 6/2010

OTHER PUBLICATIONS

International Search Report and Written Opinion; PCT/US2013/038946; dated Aug. 19, 2013; 10 pages.

*Primary Examiner* — Jeffrey J Restifo
(74) *Attorney, Agent, or Firm* — Bose McKinney & Evans LLP

(57) ABSTRACT

An access port cover system, including a housing for an item, the housing defining interior and exterior regions and including an access port through which access to the item from the exterior region is provided, a cover inhibiting access through the access port from the exterior region to the interior region, and a fastener connectable to the housing and the cover. The fastener has an actuation portion for disconnecting the housing and the cover to permit access through the access port from the exterior region to the interior region, the actuation portion being inaccessible from the exterior region when the fastener is connected to the housing and the cover.

23 Claims, 4 Drawing Sheets

(56) References Cited

U.S. PATENT DOCUMENTS

| | | | |
|---|---|---|---|
| 6,763,691 B1* | 7/2004 | Rafferty | E05B 65/0089 |
| | | | 70/164 |
| 7,337,695 B2 | 3/2008 | Müller | |
| 9,132,792 B2* | 9/2015 | Lyons | B60R 16/04 |
| 2007/0071619 A1 | 3/2007 | Shaw et al. | |
| 2008/0099258 A1* | 5/2008 | Berhan | B60K 6/405 |
| | | | 180/65.22 |
| 2009/0050387 A1* | 2/2009 | Yustick | B60K 1/04 |
| | | | 180/68.5 |
| 2009/0100965 A1* | 4/2009 | Sanji | B60K 6/26 |
| | | | 74/606 R |
| 2009/0251018 A1* | 10/2009 | Koshida | B60K 6/26 |
| | | | 310/89 |
| 2011/0133575 A1 | 6/2011 | Arashi et al. | |

* cited by examiner

SYSTEMS AND METHODS FOR COVERING ACCESS PORTS

CROSS-REFERENCE TO RELATED APPLICATION(S)

This application is a continuation of PCT International Application No. PCT/US2013/038946 having an International Filing Date of Apr. 30, 2013, which claims priority to U.S. Provisional Patent Application Ser. No. 61/640,333, entitled APPARATUSES AND METHODS FOR COVERING ACCESS PORTS filed on Apr. 30, 2012.

TECHNICAL FIELD

Embodiments of this invention relate generally to systems and methods to inhibit access to dangerous items, and to safety covers for high voltage electrical devices, such as, for example, electrical devices associated with electric and/or hybrid gas/electric vehicles. Although hybrid vehicles may be described herein with respect to gas/electric powertrain systems, the fuel powering the nonelectric portion of the hybrid powertrain may be another form of combustible fuel, such as ethanol, diesel, natural gas or vegetable oil, as non-limiting examples.

BACKGROUND

To prevent injury to individuals or damage of equipment, many products are configured with devices that limit access to dangerous or sensitive components. As an example, some high voltage electrical equipment includes access ports with high-voltage interlock (HVIL) circuits. HVIL circuits frequently operate to rapidly dissipate electrical energy stored in an electrical device when an access cover for the electrical device is removed, thereby preventing an individual from being accidentally shocked by the high voltage device. HVIL circuits typically require some form of electrical controller and wiring. However, it was realized by the inventors of the current invention that problems exist with known systems for controlling access to dangerous or sensitive equipment, such as HVIL circuits, and that improvements in access port safety covers are needed. Certain preferred features of the present invention address these and other needs and provide other important advantages.

SUMMARY

Embodiments of the present invention provide improved access port safety cover systems and methods.

In accordance with certain aspects of an embodiment disclosed herein, an improved access port cover system is provided that retains the access cover to a device (e.g., an electrical device) after the access cover is installed during the device manufacturing and/or installation process. The device has operational and nonoperational states. Once the electrical device is operational (i.e., substantially capable of operating as intended, such as in situations where the electrical device is installed as part of a larger device or system), the cover is retained such that it cannot be removed without first disassembling at least a portion of the electrical device or the larger device in which the electrical device is a component (e.g., removing the electrical device from the larger device), or damaging a part of the cover system, such as the cover, the housing (which may include a portion of the larger device or system) to which the cover is attached, or a fastener connecting the cover and the housing.

In accordance with certain other aspects of an embodiment disclosed herein, fasteners for holding a cover over an access port are accessible from inside a housing for securing and removing the cover, but are inaccessible from outside the housing for securing and removing the cover. In some embodiments, fasteners accessible from outside the housing may also be used to securely hold the cover to the housing.

In accordance with still other aspects of an embodiment disclosed herein, advantages are realized by having a cover that cannot be removed (at least without damaging a component) by either a user or a lower-level maintenance technician of the electric device during its normal service life. The cover may be removed only during disassembly of the electrical device, which should normally be performed only by higher-level maintenance technicians, such as during an overhaul of a hybrid (e.g., internal combustion (IC) engine/electric motor) powertrain by the manufacturer or service facility, during which the powertrain is at least partially disassembled.

In accordance with still other aspects of an embodiment disclosed herein, a system is used to control access to the above-mentioned dangerous or sensitive equipment.

The present disclosure provides an access port cover system including a housing for an item. The housing defines interior and exterior regions and includes an access port through which access to the item from the exterior region is provided. The system also includes a cover inhibiting access through the access port from the exterior region to the interior region, and a fastener connectable to the housing and the cover. The fastener has an actuation portion for disconnecting the housing and the cover to permit access through the access port from the exterior region to the interior region, the actuation portion being inaccessible from the exterior region when the fastener is connected to the housing and the cover.

An aspect of the access port cover system is that the actuation portion of the fastener is accessible from the interior region.

An aspect of the access port cover system is that the actuation portion is inaccessible from the exterior region without disassembling or damaging the system.

An aspect of the access port cover system is that the actuation portion is configured for being engaged with a tool.

An aspect of the access port cover system is that the housing includes a portion of a hybrid vehicle.

An aspect of the access port cover system is that the housing includes a portion of a hybrid vehicle powertrain.

An aspect of the access port cover system is that the fastener includes a securing portion and the cover includes a fastener engagement portion, the securing portion and the fastener engagement portion engageable for securing the cover to the housing. A further aspect of the system is that the securing portion and fastener engagement portion include interengageable threads.

An aspect of the access port cover system is that it further includes an external fastener optionally connectable to the housing and the cover. The external fastener has an actuation portion for disconnecting the housing and the cover, the external fastener actuation portion being accessible from the exterior region when the fastener is connected to the housing and the cover.

An aspect of the access port cover system is that the fastener is not part of the cover and is not part of the housing.

An aspect of the access port cover system is that the fastener includes a portion of the cover, a portion of the housing, or a portion of the cover and a portion of the housing.

The present disclosure also provides a system including a housing for an item having operational and nonoperational states. The housing including an access port through which the item may be accessed from the exterior of the housing. The system also includes a cover connectable to the housing, and a fastener configured and sized to connect the cover to the housing in a position that inhibits access to the item from the exterior of the housing through the access port. The fastener includes an actuation portion for connecting and disconnecting the cover and the housing, the actuation portion being inaccessible to disconnect the cover and the housing from the exterior of the housing when the fastener, the cover and the housing are connected and the item is in an operational state.

An aspect of the system is that the fastener is accessible from the interior of the housing.

An aspect of the system is that the item is a high voltage electrical component connectable to the housing, and the system further includes a hybrid vehicle and hybrid powertrain connectable to the high voltage electrical component. The actuation portion of the fastener is inaccessible while the housing is connected to the hybrid vehicle.

An aspect of the system is that the actuation portion of the fastener is inaccessible to disconnect the cover and the housing from the exterior of the housing without disassembling or damaging at least one the housing, the cover, and the fastener.

An aspect of the system is that it further includes an external fastener configured and sized to connect the cover to the housing. The external fastener includes an actuation portion for connecting and disconnecting the cover and the housing, the external fastener actuation portion being accessible to disconnect the external fastener from at least one of the housing and the cover from the exterior of the housing when the external fastener, the cover, and the housing are connected and the item is in an operational state.

The present disclosure also provides a method for covering an access port, including the steps of: connecting a cover to a housing for an item contained within the housing, in a location that inhibits access to the item through an access port in the housing from an exterior region of the housing by actuating an actuation portion of a fastener in contact with the housing and the cover; and ceasing actuation of the fastener actuation portion when the actuation portion is in a location that is inaccessible from the exterior region of the housing when the item is operational.

An aspect of the method is that it further includes the steps of: securing the cover to the housing by actuating an external fastener; and ceasing actuation of the external fastener when the actuation portion of the external fastener is in a location that is accessible from the exterior region of the housing when the item is operational.

An aspect of the method is that the actuating of the actuation portion is from an interior region of the housing. A further aspect of the method is that it further includes the step of connecting the housing to a hybrid powertrain.

This summary is provided to introduce a selection of concepts that are described in further detail in the detailed description and drawings contained herein, and is not intended to identify any primary or essential features of the claimed subject matter. Some or all of the described features may be present in the corresponding independent or dependent claims, but should not be construed to be a limitation of the scope of the invention disclosed herein, except with respect to a particular claim in which it is expressly recited. It is not necessarily intended that each embodiment described herein disclose address every object described herein, and every embodiment according to the present disclosure does not necessarily include each feature described.

Other forms, embodiments, objects, advantages, benefits, features, and aspects of the present disclosure will become apparent to one of ordinary skill in the relevant art from the detailed description and drawings contained herein. Moreover, the various devices, systems and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations and/or subcombinations is unnecessary.

BRIEF DESCRIPTION OF THE DRAWINGS

The above-mentioned aspects of exemplary embodiments will become more apparent and will be better understood by reference to the following description of those embodiments taken in conjunction with the accompanying drawings, wherein.

Figure 1:
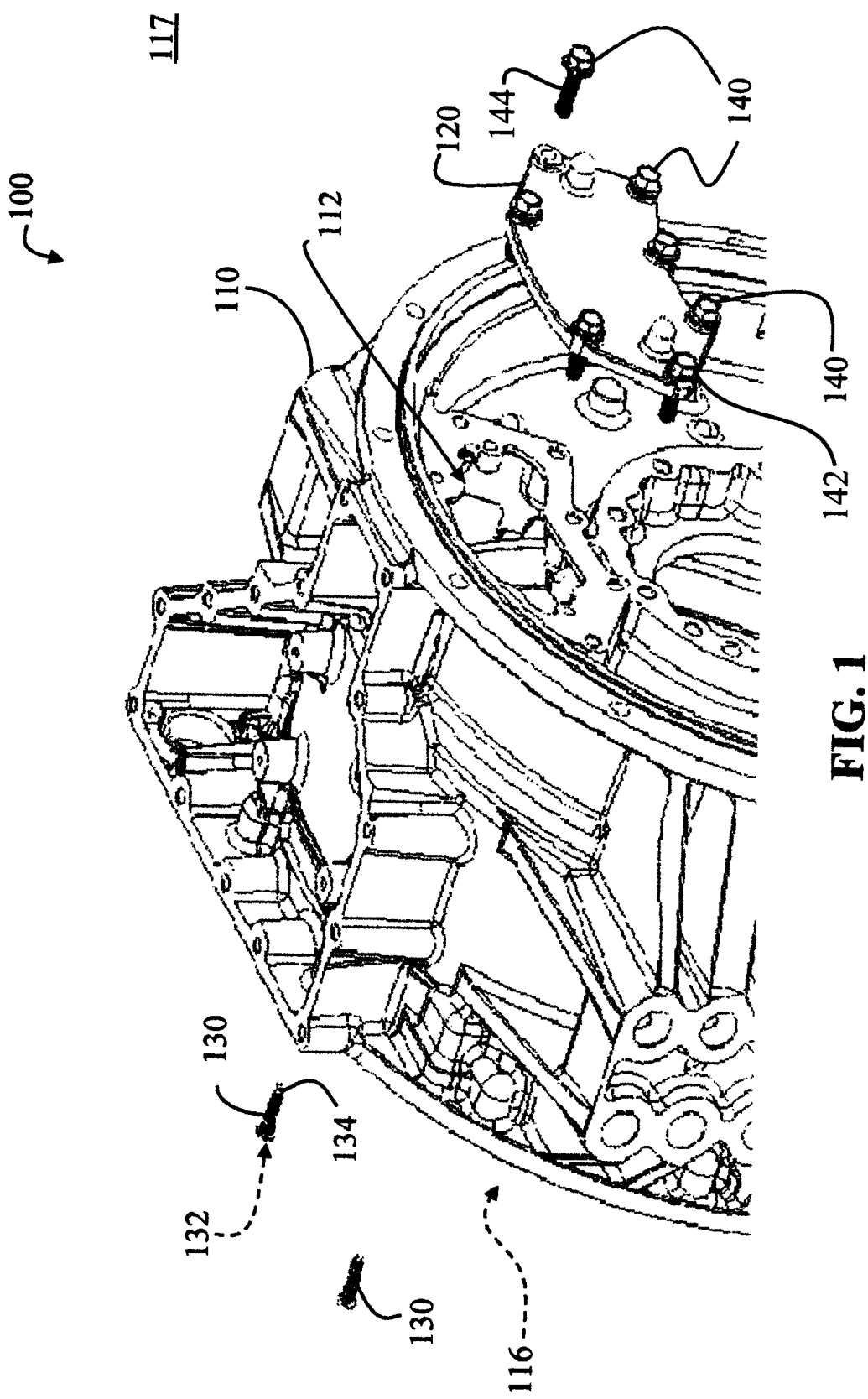
FIG. 1 is a perspective view of one embodiment of a housing access port cover system.
Figure 2:
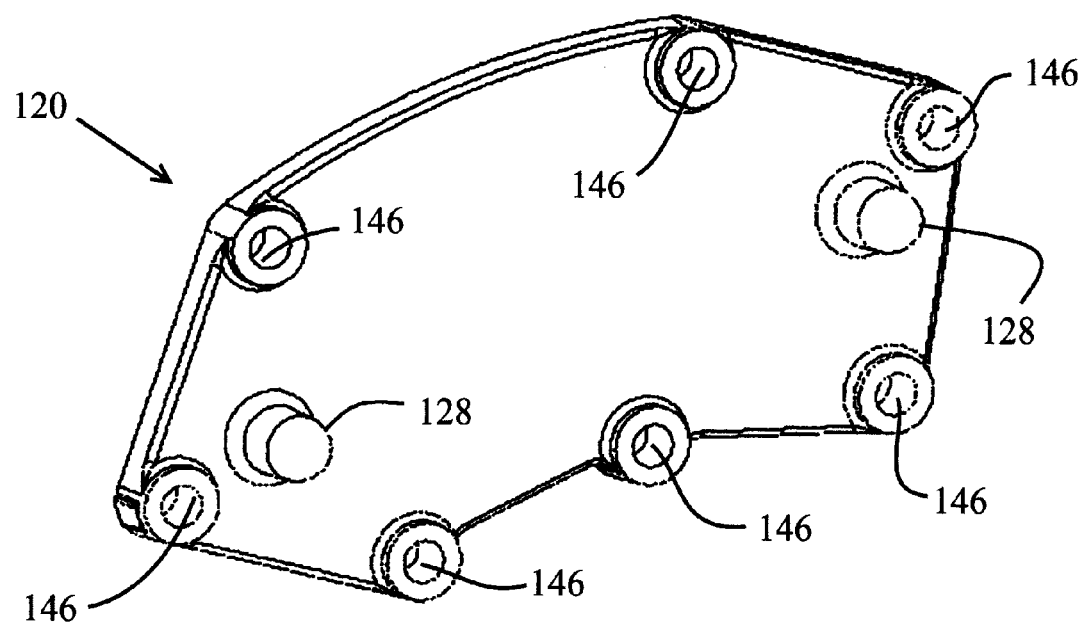
FIG. 2 is a perspective view of the exterior surface of the cover depicted in FIG. 1.
Figure 3:
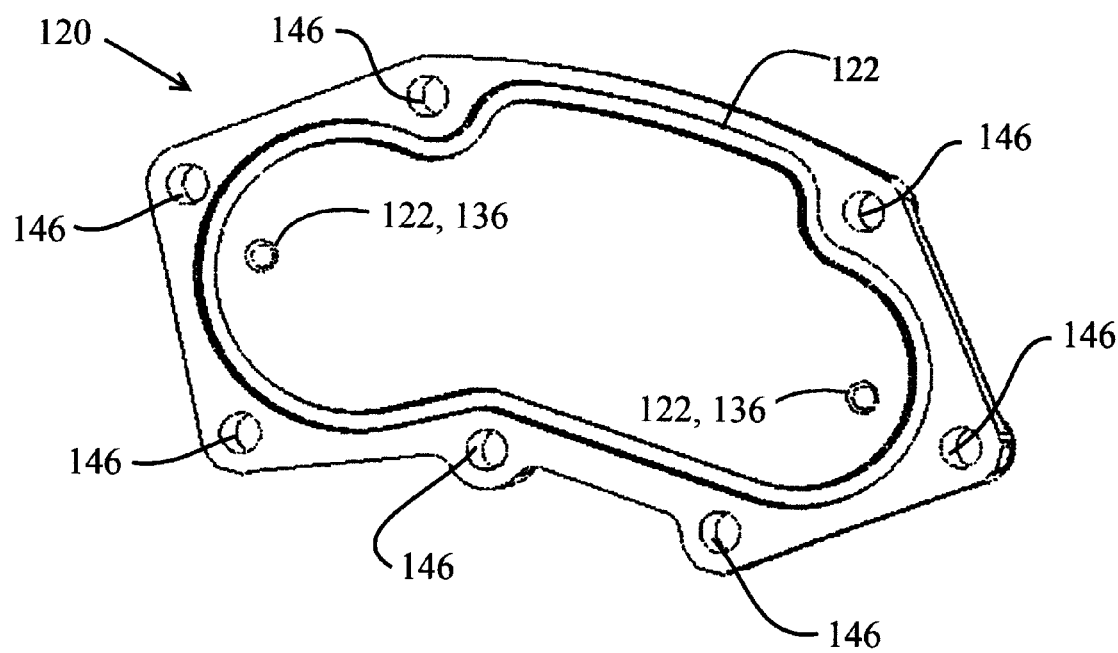
FIG. 3 is a perspective view of the interior surface of the cover depicted in FIG. 1.

Corresponding reference characters indicated corresponding parts throughout the several views. Although the drawings represent embodiments, the drawings are not necessarily to scale or to the same scale and certain features may be exaggerated in order to better illustrate and explain the present invention.

DETAILED DESCRIPTION OF EXEMPLARY EMBODIMENT(S)

The embodiments described below are not intended to be exhaustive or to limit the invention to the precise forms disclosed in the following detailed description. Rather, the embodiments are chosen and described so that others skilled in the art may appreciate and understand the principles and practices of the present invention.

Any reference to "invention" within this document is a reference to an embodiment of a family of inventions, with no single embodiment including features that are necessarily included in all embodiments, unless otherwise stated. Furthermore, although there may be references to "advantages" provided by some embodiments of the present invention, other embodiments may not include those same advantages, or may include different advantages. Any advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one of ordinary skill in the relevant art, who will appreciate that some features or some combinations of features may not be shown for the sake of clarity.

Depicted in FIGS. 1-7 is an embodiment of access port cover system 100, which has an associated method for covering and/or uncovering access port 112 such as described herein. Cover system 100 includes housing 110 which may be a housing for an electrical device, or at least a part of such a housing. Access port 112 is located in housing 110, and cover system 100 includes access port cover 120 and at least one internal fastener 130. Some embodiments of access port cover system 100 may also include one or more external fasteners 140, as shown.

Housing 110 defines interior region 116 in which an item (not shown) such as a component of the device, to which access is to be controlled, is at least partially contained. Housing 110 further defines exterior region 117 from which access to the item is to be controlled. For example, in one embodiment of system 100, housing 110 at least partially encloses an item that is an electrical component which may be a high voltage component in the electric motor portion of a vehicle hybrid IC engine/electric motor powertrain. System 100 inhibits access to the high voltage electrical component by people (such as mechanics and vehicle owners), their tools, and foreign objects such as water and dirt, particularly when housing 110 and the component are installed in the vehicle, and have an operational state. Although limiting access to interior region 116 is desirable when housing 110 and the electrical component are operational, it may be desirable to permit access to interior region 116 and/or the item during manufacturing and/or installation of the component and/or housing 110. Access port 112 provides access to interior region 116 while cover 120 is removed. Cover 120 inhibits access to interior region 116 when positioned over access port 112. Cover 120 optionally includes sealing portion, such as groove 126 for receiving a gasket (not shown) to maintain a seal between cover 120 and housing 110.

Cover 120 includes one or more fastener engagement portions 122. Fastener engagement portion 122 shown in the figures is a tapped hole. Although internal fasteners 130 are not accessible or visible from exterior region 117 in the illustrated embodiment, wherein fastener engagement portion 122 is a tapped, blind hole located in a boss 128, alternative embodiments are readily envisioned in which internal fasteners 130 are visible, but not operationally accessible, from exterior region 117. In other words, portions of internal fasteners 130 in such alternative embodiments are visible from exterior region 117, but a user of the device is unable to access internal fastener actuation portion 132 without damaging housing 110, cover 120, or internal fastener 130. For example, fastener engagement portion 122 may be a tapped, through hole open at its opposite ends. One or more fasteners accessible from interior region 116 (for example, one or more internal fasteners 130) engages one or more fastener engagement portions 122 and holds cover 120 securely over access port 112. When installed to hold cover 120 over access port 112, internal fastener(s) 130 can be actuated from interior region 116, but cannot be actuated from exterior region 117 to remove cover 120 from access port 112. For example, in the embodiment depicted in FIG. 1, each internal fastener 130 is inserted from interior region 116 through fastener aperture 114, which may be a clearance hole, in housing 110. Each internal fastener 130 engages a fastener engagement portion 122 of cover 120.

Each internal fastener includes an actuation portion that is manipulated to connect (or disconnect) cover 120 and housing 110. The internal fastener also includes a securing portion that holds cover 120 and housing 110 together when the actuation portion is no longer being manipulated. For example, internal fastener 130 includes actuation portion 132 and securing portion 134. Actuation portion 132 is adapted to be manipulated to connect or disconnect access port cover 120 and housing 110. When the actuation portion 132 of fastener 130 is manipulated to connect access port cover 120 and housing 110, securing portion 134 of internal fastener 130 engages cover 120 and/or housing 110.

Figure 5:
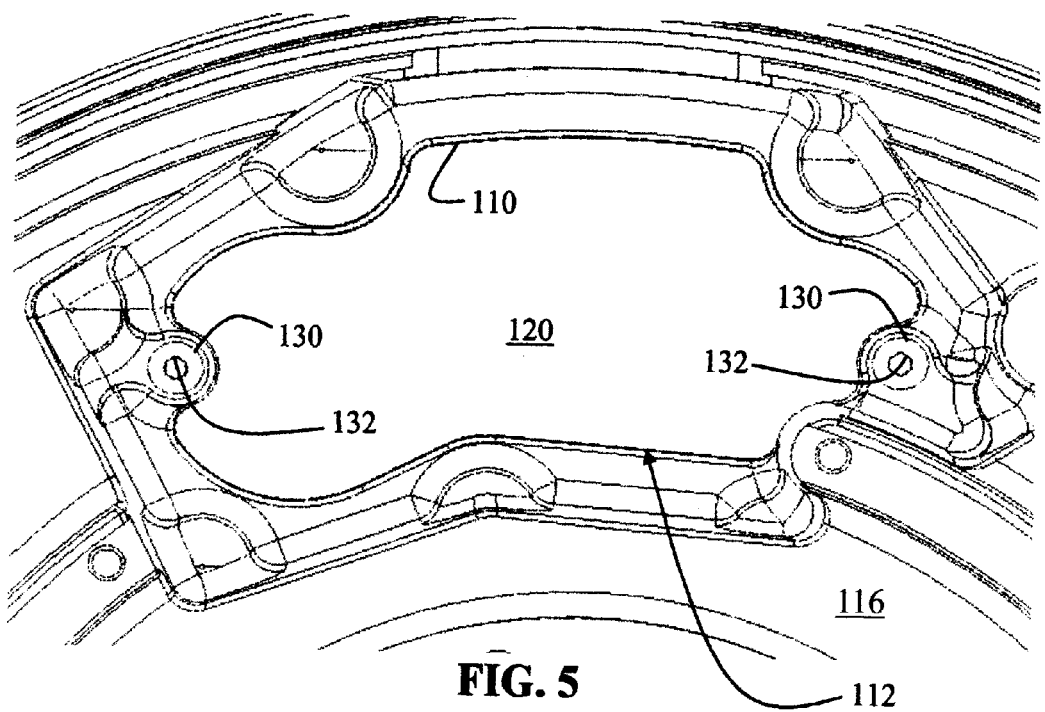
FIG. 5 is a perspective view of the housing access port depicted in FIG. 1 with the cover installed as viewed from the interior region defined by the housing.
Figure 7:
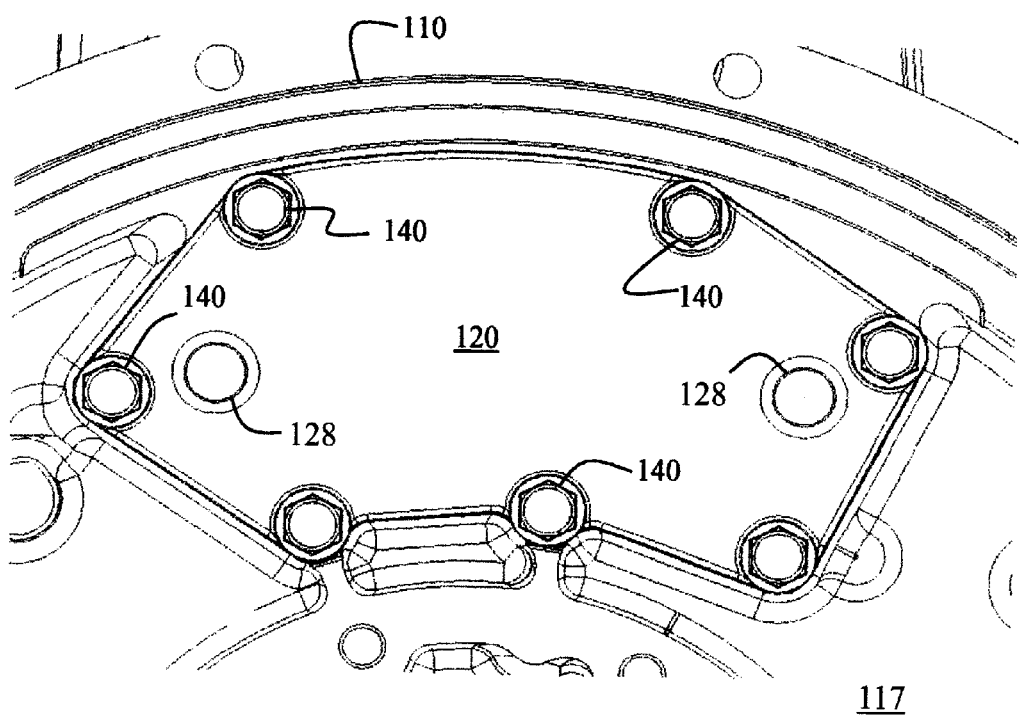
FIG. 7 is a perspective view of the housing access port depicted in FIG. 1 with the cover installed as viewed from the exterior region defined by the housing.

Referring to the example embodiment depicted in FIG. 1, internal fastener 130 is a threaded bolt that engages internal threads 136 of cover fastener engagement portion 122. Internal fastener actuation portion 132 as shown includes the internal hexagonal surfaces of the bolt head depicted in FIG. 5, and can be manipulated by a torquing tool (not shown) such as a wrench to rotate bolt 130. Securing portion 134 (e.g., the threads of bolt 130 and the bolt head surface nearest the bolt threads) holds cover 120 and housing 110 together. In the depicted embodiment, the head of bolt 130 engages the rim 138 surrounding fastener aperture 114 and bolt threads engage internally threaded portion 136 of cover fastener engagement portion 122. As can be seen in FIGS. 1, 5, and 7, internal fastener actuation portion 132 is accessible from interior region 116 but is inaccessible from exterior region 117.

In embodiments where the item within housing 110 is a component of a larger device, a portion of housing 110 may be a part of the larger device. For example, in some embodiments of system 100 where the item within housing 110 is a high voltage electrical device for a hybrid vehicle, a portion of housing 110 may be formed by a part of the vehicle to which the portion of housing 110 depicted in FIG. 1 is attached.

Figure 4:
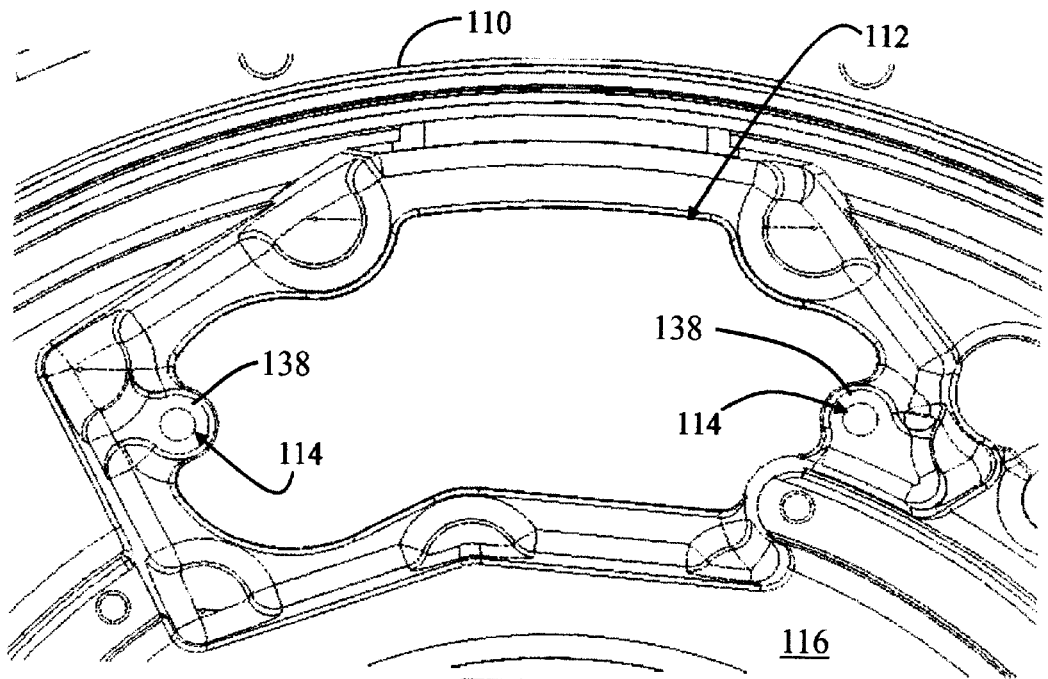
FIG. 4 is perspective view of the housing access port depicted in FIG. 1 as viewed from the interior region defined by the housing.
Figure 6:
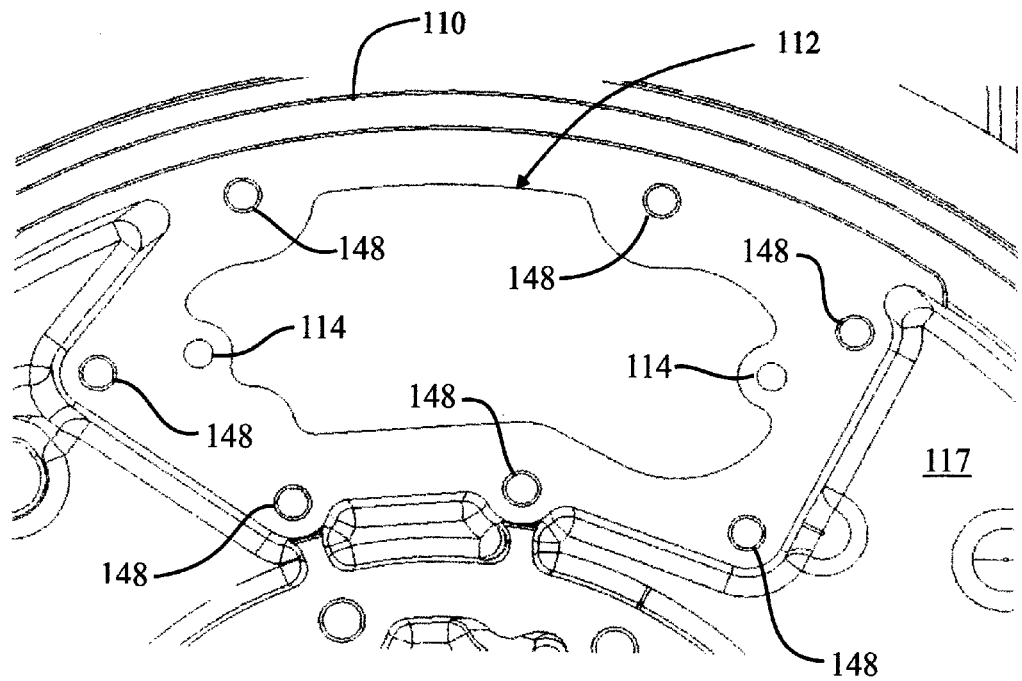
FIG. 6 is a perspective view of the housing access port depicted FIG. 1 as viewed from the exterior region defined by the housing.

FIG. 4 depicts access port 112 and fastener apertures 114 of housing 110 as viewed from interior region 116. FIG. 5 depicts a view from the same perspective as FIG. 4, but with cover 120 positioned over access port 112 and internal fasteners 130 holding cover 120 in position over access port 112. FIG. 6 depicts access port 112 and fastener apertures 114 as viewed from exterior region 117. FIG. 7 depicts a view from the same perspective as FIG. 6, but with cover 120 secured over access port 112.

As shown, embodiments of system 100 may optionally include one or more fasteners (for example, external fasteners 140) accessible from exterior region 117 that are used to further secure cover 120 over access port 112. Unlike internal fasteners 130, external fasteners 140 may be accessed and manipulated from exterior region 117 when housing 110 and the item (e.g., a high voltage electrical component) within interior region 116 are operational. External fasteners 140 may be substantially similar to internal fasteners 130, and be provided with actuation portions 142 and securing portions 144 respectively similar to actuation portions 132 and securing portions 134. As shown, the actuation portions 142 of fasteners 140 include the external hexagonal surfaces of the bolt head. External fasteners 140 are received into clearance holes 146 of cover 120 and engage the internal threads of tapped holes 148 in housing 110.

In use, access port 112 allows workers to gain access to interior region 116 from exterior region 117 during the manufacture and, if required, installation of housing 110 and the item contained within. This may be useful for various purposes during manufacture or installation, such as when securing the item within housing 110 or inspecting the installation of the item within housing 110. Once the need to gain access to interior region 116 is no longer required, cover 120 is positioned over access port 112 and secured in position with one or more internal fasteners 130. One or more external fasteners 140 may also be used to further secure cover 120 in position over access port 112.

After access port cover 120 has been secured in position relative to housing 110 to inhibit access to interior region 116 through access port 112, housing 110 and the device componentry contained within housing 110 are configured for operation. In the example of an embodiment of system 100 related to hybrid vehicles, housing 110 and the high voltage electrical device are operationally connected to the vehicle and configured for operation (e.g., once operational), interior region 116 and actuation portion(s) 132 of internal fastener(s) 130 are inaccessible from exterior region 117 without de-configuring housing 110 and/or device componentry contained within housing 110 from operation, or damaging a component of system 100 or the device to which housing 110 and/or the item contained within housing 110 are attached. In the example of an embodiment of system 100 related to hybrid vehicles, actuation portions 132 of internal fasteners 130 cannot be accessed from exterior region 117 without removing housing 110 from the vehicle, or damaging housing 110, cover 120, internal fastener 130 or the vehicle.

Although internal fastener 130 is depicted as a bolt in FIG. 1, in alternative embodiments of system 100 internal fasteners 130 may include, by way of non-limiting examples, screws, retaining rings, clips, retaining collars with expandable inserts, and/or cotter pins. In some embodiments of system 100 actuation portion 132 and securing portion 134 are selfsame, while in other embodiments of system 100 actuation portion 132 and securing portion 134 are different. In still other embodiments of system 100, actuation portion 132 for connection is the same as actuation portion 132 for disconnection, and in still further embodiments of system 100 actuation portion 132 for connection is different from actuation portion 132 for disconnection.

In still other embodiments of system 100, internal fastener 130 is a portion of cover 120, a portion of housing 110, or a portion of cover 120 and a portion of housing 110. For example, in alternative embodiments of system 100 housing 110 includes a retaining aperture (not shown) through which an expandable insert portion (not shown) of cover 120 is inserted, and when a tip of the insert portion is inserted past a point at which it can expand, the tip expands and inhibits removal of cover 120. In such an embodiment, to remove the cover 120 the insert portion expandable tip is compressed and the insert portion is removed from the retaining aperture.

In other embodiments of system 100, access port cover 120 is installed on housing 110 of an electric motor used to power equipment other than the drive wheels of a vehicle. For example, in one embodiment of system 100 access port cover 120 is installed on housing 110 of an electric motor that drives auxiliary devices on equipment used in agricultural, mining, or construction applications. Embodiments of system 100 may be used with various types of electric machines, such as traction motors, induction motors, permanent magnet motors (including internal and surface mounted magnets), generators or other types of rotating electrical devices. Further embodiments of system 100 limit access to particular portions of electric machines, for example, various dangerous or sensitive components such as stators (including conventional round wire wound stators and high voltage hairpin ("HVH") stators), rotors (including AC induction rotors, which may be made of copper, aluminum, or other suitable material), windings, or the like. Some embodiments of system 100 may be used to limit access in electric and nonelectric devices, and may be used to limit access to rotating components of machinery, such as driveshafts, camshafts and electric rotors.

The following is a list of enumerated, exemplary embodiments of system 100, and methods associated therewith:

1. An access port cover system, including:
   a housing for an item, the housing defining an interior region and an exterior region and including an access port through which access to the item from the exterior region is provided;
   a cover inhibiting access through the access port from the exterior region to the interior region; and
   a fastener connectable to the housing and the cover, the fastener having an actuation portion for disconnecting the housing and the cover to permit access through the access port from the exterior region to the interior region, the actuation portion being inaccessible from the exterior region when the fastener is connected to the housing and the cover.
2. The system of exemplary embodiment 1, wherein the actuation portion of the fastener is accessible from the interior region.
3. The system of exemplary embodiment 1 or 2, wherein the actuation portion is inaccessible from the exterior region without disassembling or damaging the system.
4. The system of any one of exemplary embodiments 1 to 3, wherein the actuation portion is configured for being engaged with a tool.
5. The system of any one of exemplary embodiments 1 to 4, wherein the housing includes a portion of a hybrid vehicle.
6. The system of any one of exemplary embodiments 1 to 5, wherein the housing includes a portion of a hybrid vehicle powertrain.
7. The system of any one of exemplary embodiments 1 to 6, wherein the fastener includes a securing portion and the cover includes a fastener engagement portion, the securing portion and the fastener engagement portion engageable for securing the cover to the housing.
8. The system of exemplary embodiment 7, wherein the securing portion and fastener engagement portion include interengageable threads.

9. The system of any one of exemplary embodiments 1 to 8, further including:
an external fastener optionally connectable to the housing and the cover, the external fastener having an actuation portion for disconnecting the housing and the cover, the external fastener actuation portion being accessible from the exterior region when the fastener is connected to the housing and the cover.

10. The system of any one of exemplary embodiments 1 to 9, wherein the fastener is not part of the cover and is not part of the housing.

11. The system of any one of exemplary embodiments 1 to 9, wherein the fastener includes a portion of the cover, a portion of the housing, or a portion of the cover and a portion of the housing.

12. A system, including:
a housing for an item having operational and nonoperational states, the housing including an access port through which the item may be accessed from the exterior of the housing;
a cover connectable to the housing;
a fastener configured and sized to connect the cover to the housing in a position that inhibits access to the item from the exterior of the housing through the access port, the fastener including an actuation portion for connecting and disconnecting the cover and the housing, the actuation portion being inaccessible to disconnect the cover and the housing from the exterior of the housing when the fastener, the cover and the housing are connected and the item is in an operational state.

13. The system of exemplary embodiment 12, wherein the fastener is accessible from the interior of the housing.

14. The system of exemplary embodiment 12 or 13, wherein the item is a high voltage electrical component connectable to the housing; and
further including a hybrid vehicle and hybrid powertrain connectable to the high voltage electrical component;
wherein the actuation portion of the fastener is inaccessible while the housing is connected to the hybrid vehicle.

15. The system of any one of exemplary embodiments 12 to 14, wherein the actuation portion of the fastener is inaccessible to disconnect the cover and the housing from the exterior of the housing without disassembling or damaging at least one the housing, the cover, and the fastener.

16. The system of any one of exemplary embodiments 12 to 15, further including:
an external fastener configured and sized to connect the cover to the housing, the external fastener including an actuation portion for connecting and disconnecting the cover and the housing, the external fastener actuation portion being accessible to disconnect the external fastener from at least one of the housing and the cover from the exterior of the housing when the external fastener, the cover, and the housing are connected and the item is in an operational state.

17. A method for covering an access port, including the steps of:
connecting a cover to a housing for an item contained within the housing, in a location that inhibits access to the item through an access port in the housing from an exterior region of the housing by actuating an actuation portion of a fastener in contact with the housing and the cover; and
ceasing actuation of the fastener actuation portion when the actuation portion is in a location that is inaccessible from the exterior region of the housing when the item is operational.

18. The method of exemplary embodiment 17, further including the steps of:
securing the cover to the housing by actuating an external fastener; and
ceasing actuation of the external fastener when the actuation portion of the external fastener is in a location that is accessible from the exterior region of the housing when the item is operational.

19. The method of exemplary embodiment 17 or 18, wherein the actuating of the actuation portion is from an interior region of the housing.

20. The method of any one of exemplary embodiments 17 to 19, further including the step of connecting the housing to a hybrid powertrain.

While illustrated examples, representative embodiments and specific forms of the invention have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. Exemplary embodiments have been shown and described, and all changes and modifications that come within the spirit of the invention are desired to be protected.

What is claimed is:

1. An access port cover system, comprising:
a housing defining an interior region inside of the housing and an exterior region outside of the housing;
an access port disposed on an exterior wall of the housing through which access to an item in the interior region from the exterior region is provided;
a cover inhibiting access through the access port from the exterior region to the interior region; and
a fastener connectable to the exterior wall of the housing and the cover, the fastener having an actuation portion for disconnecting the housing and the cover to permit access through the access port from the exterior region to the interior region, the actuation portion disposed in the interior region and being inaccessible from the exterior region when the fastener is connected to the exterior wall of the housing and the cover.

2. The system of claim 1, wherein the actuation portion of the fastener is accessible from the interior region.

3. The system of claim 1, wherein the actuation portion is inaccessible from the exterior region without disassembling or damaging the system.

4. The system of claim 1, wherein the actuation portion is configured for being engaged with a tool.

5. The system of claim 1, wherein the housing comprises a portion of a hybrid vehicle.

6. The system of claim 1, wherein the housing comprises a portion of a hybrid vehicle powertrain.

7. The system of claim 1, wherein the fastener includes a securing portion and the cover includes a fastener engagement portion, the securing portion and the fastener engagement portion engageable for securing the cover to the housing.

8. The system of claim 7, wherein the securing portion and fastener engagement portion comprise interengageable threads.

9. The system of claim 1, further comprising:
an external fastener optionally connectable to the housing and the cover, the external fastener having an actuation portion for disconnecting the housing and the cover, the external fastener actuation portion being accessible from the exterior region when the fastener is connected to the housing and the cover.

10. The system of claim 1, wherein the fastener is not part of the cover and is not part of the housing.

11. The system of claim 1, wherein the fastener comprises a portion of the cover, a portion of the housing, or a portion of the cover and a portion of the housing.

12. The system of claim 1, wherein the access port is covered by the cover.

13. The system of claim 1, wherein the cover has an interior side facing the interior region and an exterior side facing away from the housing.

14. The system of claim 13, wherein the actuation portion is disposed on the interior side of the cover.

15. A system, comprising:
a housing for an item having operational and nonoperational states, the housing including an access port disposed on an exterior wall of the housing through which the item may be accessed from the exterior of the housing;
a cover connectable to the housing;
a fastener configured and sized to connect the cover to the housing in a position that inhibits access to the item from the exterior of the housing through the access port, the fastener including an actuation portion for connecting and disconnecting the cover and the housing, the actuation portion being inaccessible from the exterior wall of the housing to disconnect the cover and the housing from the exterior of the housing when the fastener, the cover and the housing are connected and the item is in an operational state.

16. The system of claim 15, wherein the fastener is accessible from the interior of the housing.

17. The system of claim 15, wherein the item is a high voltage electrical component connectable to the housing; and
further comprising a hybrid vehicle and hybrid powertrain connectable to the high voltage electrical component;
wherein the actuation portion of the fastener is inaccessible while the housing is connected to the hybrid vehicle.

18. The system of claim 15, wherein the actuation portion of the fastener is inaccessible to disconnect the cover and the housing from the exterior of the housing without disassembling or damaging at least one the housing, the cover, and the fastener.

19. The system of claim 15, further comprising:
an external fastener configured and sized to connect the cover to the housing, the external fastener including an actuation portion for connecting and disconnecting the cover and the housing, the external fastener actuation portion being accessible to disconnect the external fastener from at least one of the housing and the cover from the exterior of the housing when the external fastener, the cover, and the housing are connected and the item is in an operational state.

20. A method for covering an access port, comprising the steps of:
connecting a cover to an exterior wall of a housing for an item contained within the housing, in a location that inhibits access to the item through an access port in the housing from an exterior region of the housing by actuating an actuation portion of a fastener in contact with the exterior wall of the housing and the cover; and
ceasing actuation of the fastener actuation portion when the actuation portion is in a location that is inaccessible from the exterior region of the housing when the item is operational.

21. The method of claim 20, further comprising the steps of:
securing the cover to the housing by actuating an external fastener; and
ceasing actuation of the external fastener when the actuation portion of the external fastener is in a location that is accessible from the exterior region of the housing when the item is operational.

22. The method of claim 20, wherein the actuating of the actuation portion is from an interior region of the housing.

23. The method of claim 20, further comprising the step of connecting the housing to a hybrid powertrain.

* * * * *